United States Patent
Hirsch et al.

(10) Patent No.: US 6,688,474 B1
(45) Date of Patent: Feb. 10, 2004

(54) PROCESS FOR REMOVING RELATIVELY COARSE-GRAINED SOLIDS FROM A STATIONARY FLUIDIZED BED

(75) Inventors: Martin Hirsch, Friedrichsdorf (DE); Andreas Orth, Friedrichsdorf (DE); Peter Weber, Hammersbach (DE)

(73) Assignee: Metallgesellschaft Aktiengesellschaft, Frankfurt/Main (DE)

( * ) Notice: Subject to any disclaimer, the term of this patent is extended or adjusted under 35 U.S.C. 154(b) by 0 days.

(21) Appl. No.: 09/700,358
(22) PCT Filed: Jul. 1, 1999
(86) PCT No.: PCT/EP99/04526
§ 371 (c)(1), (2), (4) Date: Nov. 13, 2000
(87) PCT Pub. No.: WO00/02654
PCT Pub. Date: Jan. 20, 2000

(65) Prior Publication Data
(65)

(30) Foreign Application Priority Data

Jul. 8, 1998 (DE) .......................... 198 30 697

(51) Int. Cl.[7] ................................ B07B 4/00
(52) U.S. Cl. ........................ 209/474; 209/477
(58) Field of Search .............. 209/474, 475, 209/477, 490, 492, 494, 495, 491, 496

(56) References Cited

U.S. PATENT DOCUMENTS

| | | | | | |
|---|---|---|---|---|---|
| 923,455 | A | * | 6/1909 | Stebbins | 209/474 |
| 1,029,089 | A | * | 6/1912 | Stanhope | 209/437 |
| 1,291,137 | A | * | 1/1919 | Reed | 209/474 |
| 1,801,195 | A | * | 4/1931 | Fraser | 209/474 |
| 3,366,080 | A | * | 1/1968 | Albertson | 110/190 |
| 3,804,250 | A | * | 4/1974 | Dankesreiter | 209/475 |
| 4,908,124 | A | * | 3/1990 | Goldbach et al. | 209/139.1 |

FOREIGN PATENT DOCUMENTS

FR 2159182 A * 11/1971 ............. B05B/5/00

* cited by examiner

Primary Examiner—Donald P. Walsh
Assistant Examiner—Joseph C Rodriguez
(74) Attorney, Agent, or Firm—Herbert Dubno

(57) ABSTRACT

According to the invention, a fluidizing gas is introduced upwards into the fluidized bed (3) through a valve grid (2), said stationary fluidized bed (3) containing solids with different grain sizes. A supply pipe (10) is disposed in the area of the fluidized bed, the mouth of said pipe being located above the valve grid (2) and its outlet (12) leading outwards from the fluidized bed (3). Part of the solids located above the valve grid (2) is blown into the supply pipe by a gas jet (13) which is directed upwards and fed separately from the fluidizing gas and pneumatically evacuated from the fluidized bed through the supply pipe (10). Normally, the flow speed of the gas in the supply pipe is at least two times higher than the speed of the fluidizing gas in the fluidized bed.

2 Claims, 1 Drawing Sheet

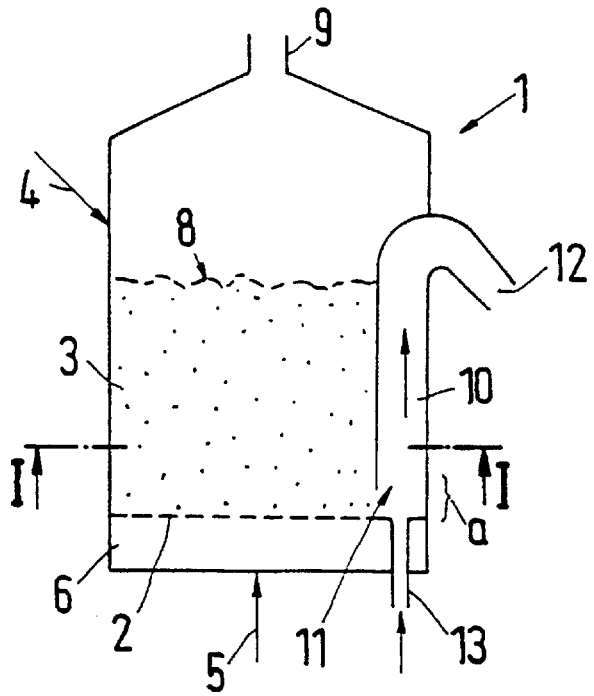
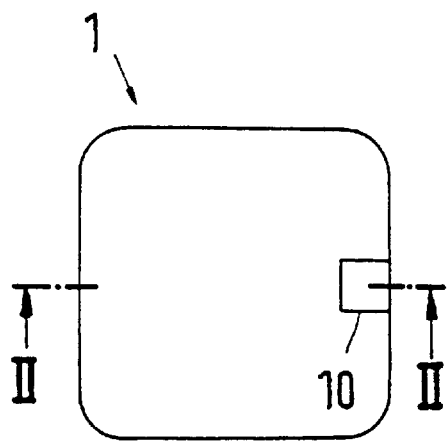
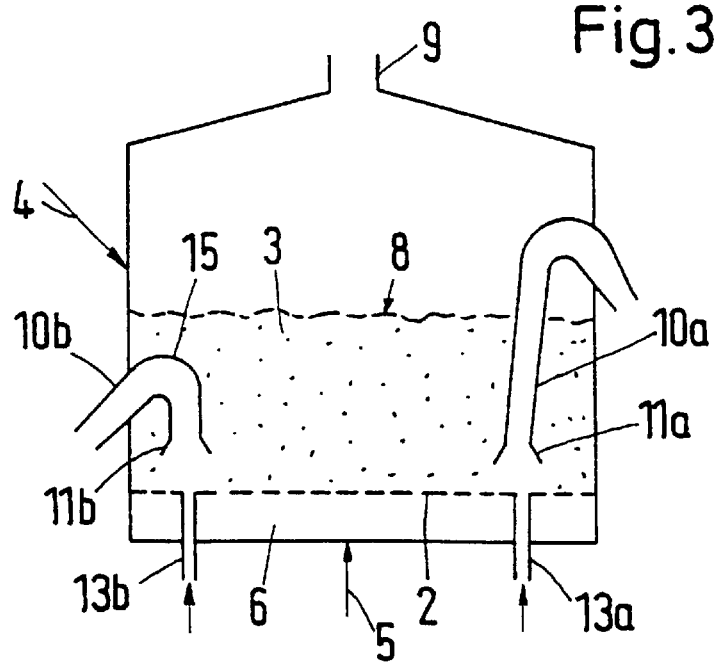

PROCESS FOR REMOVING RELATIVELY COARSE-GRAINED SOLIDS FROM A STATIONARY FLUIDIZED BED

CROSS REFERENCE TO RELATED APPLICATIONS

This application is a national stage of PCT/EP 99/04526 filed Jul. 1, 1999 and based, in turn, upon German national application 198 30 697.0 filed Jul. 8, 1998 under the International Convention.

FIELD OF THE INVENTION

This invention relates to a process for removing relatively coarse-grained solids from a stationary fluidized bed, which contains solids of different grain sizes, wherein fluidizing gas is introduced into the fluidized bed from the bottom, distributed through a jet bank.

BACKGROUND OF THE INVENTION

Stationary fluidized beds of this kind are generally known. They are characterized by a more or less precisely defined bed surface, which moves for instance like a boiling liquid. During an extended operation of the fluidized bed solids of a relatively large grain size accumulate in the lower portion of the bed above the jet bank, as they are not fluidized or are hardly fluidized. This accumulation of coarse grain can be disturbing in many cases, as it can for instance lead to different dwell times of the solids in the fluidized bed and also to an overheating and sintering in the vicinity of the jet bank. The withdrawal of this coarse grain under the influence of gravity downwards through the jet bank or laterally through the container wall requires a considerable effort in terms of equipment and control technology.

OBJECT OF THE INVENTION

It is the object of the invention to be able to at least partly and easily remove the relatively coarse-grained solids accumulating in the lower portion of a stationary fluidized bed.

SUMMARY OF THE INVENTION

In accordance with the invention this is achieved in the above-mentioned process in that by means of at least one upwardly directed gas jet supplied separate from the fluidizing gas part of the solids disposed above the jet bank are blown into a conveying tube, and these solids are pneumatically removed from the fluidized bed through the conveying tube. Since the relatively coarse-grained solids accumulate directly above the jet bank, the same are, as far as they are disposed in direct vicinity of the inlet opening of the conveying tube, blown out of the fluidized bed through the conveying tube together with the fine-grained solids present near the inlet opening. The solids discharged in this way car, be separated into a coarse grain fraction and a fine grain fraction by screening them outside the fluidized bed, where for instance the fine grain fraction is directly recirculated to the fluidized bed and the coarse grain fraction is first of all comminuted or subjected to a special treatment in a second container.

The solids in the fluidized bed may have any temperature, the spectrum of grain sizes may include grain sizes in the range from 0.1 to 10 mm, but there are no absolute size limits for this method.

The gas velocities of the fluidizing gas usually lie in the range from 0.1 to 1 m/sec, where these figures are measured as empty-tube velocities, here and later on. One or several gas jets are upwardly directed from the bottom against the inlet opening of the conveying tube, they entrain the solids and guide them through the conveying tube, through which they leave the fluidized bed. The gas velocities in the conveying tube usually are at least twice as high as the velocity of the fluidizing gas in the fluidized bed. Usually, the gas velocities in the conveying tube are twice to five times as high as in the fluidized bed.

It may be sufficient to install in the fluidized bed a single conveying tube with at least one associated gas jet coming from the bottom, but there may very well also be provided a plurality of conveying tubes at different points in the fluidized bed, to each of which at least one gas jet is associated.

BRIEF DESCRIPTION OF THE DRAWING

Embodiments of the method will be explained with reference to the drawing, wherein:

FIG. 1 shows a vertical section along line II—II of FIG. 2 through a fluidized-bed reactor in a schematic representation;

FIG. 2 shows a horizontal section along line I—I through the reactor illustrated in FIG. 1; and FIG. 3 shows a vertical section through a fluidized-bed reactor with two conveying tubes.

SPECIFIC DESCRIPTION

The reactor 1 illustrated in FIGS. 1 and 2 has a stationary fluidized bed 3 above a jet bank 2. Solids of different grain sizes are charged into the reactor through line 4, and fluidizing gas is supplied through line 5. The fluidizing gas first of all enters a distribution chamber 6, before it flows through the jet bank 2 into the fluidized bed 3. The fluidized tied has a solids surface 8, through which the gas escapes in upward direction, where a certain amount of the finegrained solids is entrained. The gas leaves the reactor through the outlet 9, and is supplied for instance to a dedusting not represented here.

At the wall of the reactor 1, see FIGS. 1 and 2, a conveying tube 10 is provided, which has an inlet opening 11 and an outlet 12. The inlet opening 11 lies above the jet bank 2 by the vertical distance (a), where (a) usually is 10 to 500 mm. Below the conveying tube 10 and also directly below the jet bank 2 a vertical gas line 13 is provided, through which in a manner not represented here a gas jet is blown from the bottom upwards through the inlet opening 11 into the conveying tube 10. The upper end of the line 13 is disposed approximately at the level of the jet bank 2, so that solids from the fluidized bed 3 constantly flow into the range of influence of the gas jet, which carries the same into the conveying tube 10 and to the outlet 12. It may be expedient to supply the solids coming through the outlet 12, which are relatively coarse-grained, to a comminution or to a not represented second fluidized bed. The fine grain component in the solids may first be screened out.

The number of the conveying tubes installed in the fluidized bed of a reactor may be chosen as desired. In FIG. 3, two conveying tubes 10a and 10b are represented, to which gas lines 13a and 13b, respectively, are associated. The conveying tube 10a is slightly inclined towards the top, and it protrudes beyond the surface 8 of the fluidized bed. On the other hand, the upper bend 15 of the conveying tube 10b lies in the fluidized bed 3 slightly below its surface 8. The inlet openings 11a and 11b of the two conveying tubes shown in FIG. 3 are slightly flared towards the bottom, but this is not absolutely necessary. The remaining reference numerals of FIG. 3 have the meaning explained already in conjunction with FIGS. 1 and 2.

EXAMPLE

Into a continuously operated fluidized bed reactor, which is designed in accordance with FIGS. 1 and 2, 1125 kg/h quartz sand are charged. 90 wt-% of the sand have a grain size of to 2.2 mm. The jet bank 2 has a surface area of 4.2 m2, the height of the bed is 0.6 m. For fluidizing purposes air is used, whose empty-tube velocity in the vicinity of the bed is 0.2 m/s. In the vicinity of the orifice 11, the air supplied to the conveying tube 10 through line 13 has an empty-tube velocity of 0.6 m/s. The conveying tube has a cross-sectional area of 166 cm$^2$, its distance (a) from the jet bank is 100 mm.

During an operation of 4 hours, the sand blown out through the conveying tube is collected in a container. The total amount of this sand is 270 kg, of which 180 kg (=66.7 wt-%) have a grain size of 0.5–2.2 mm, so that preferably coarse-grained solids have been discharged.

What is claimed is:

1. A process for removing relatively coarse grained solids from a stationary fluidized bed, comprising the steps of:

(a) fluidizing a stationary fluidized bed above a jet bank by introducing a fluidizing gas into said bed at a bottom thereof through jets of said jet bank;

(b) providing an upright conveying tube in said fluidized bed above said jet bank, said conveying tube having an inlet opening close to but above said jet bank at a distance of 10 to 500 mm therefrom;

(c) directing a jet of a conveying gas upwardly into said conveying tube independently of the fluidizing gas and gas discharged by the jets of said jet bank, from a vertical gas line spaced below said inlet opening, said vertical gas line having an upper end from which said conveying gas is discharged located at approximately a level of said jet bank, whereby relatively coarse grained solids from said bed are entrained upwardly in said conveying tube by said conveying gas;

(d) passing said relatively coarse grained solids entrained upwardly in said conveying tube by said conveying gas to and through a bend at an upper end of said conveying tube and then downwardly out of said fluidized bed; and (e) adjusting a gas velocity in said conveying tube to be at least twice as high as a fluidizing gas velocity in said fluidized bed.

2. The process defined in claim 1, further comprising the step of:

(f) introducing the relatively coarse grained solids entrained upwardly in said conveying tube by said conveying gas to and through said bend at said upper end of said conveying tube and then downwardly out of said fluidized bed into a second fluidized bed.

\* \* \* \* \*